Patented Oct. 14, 1947

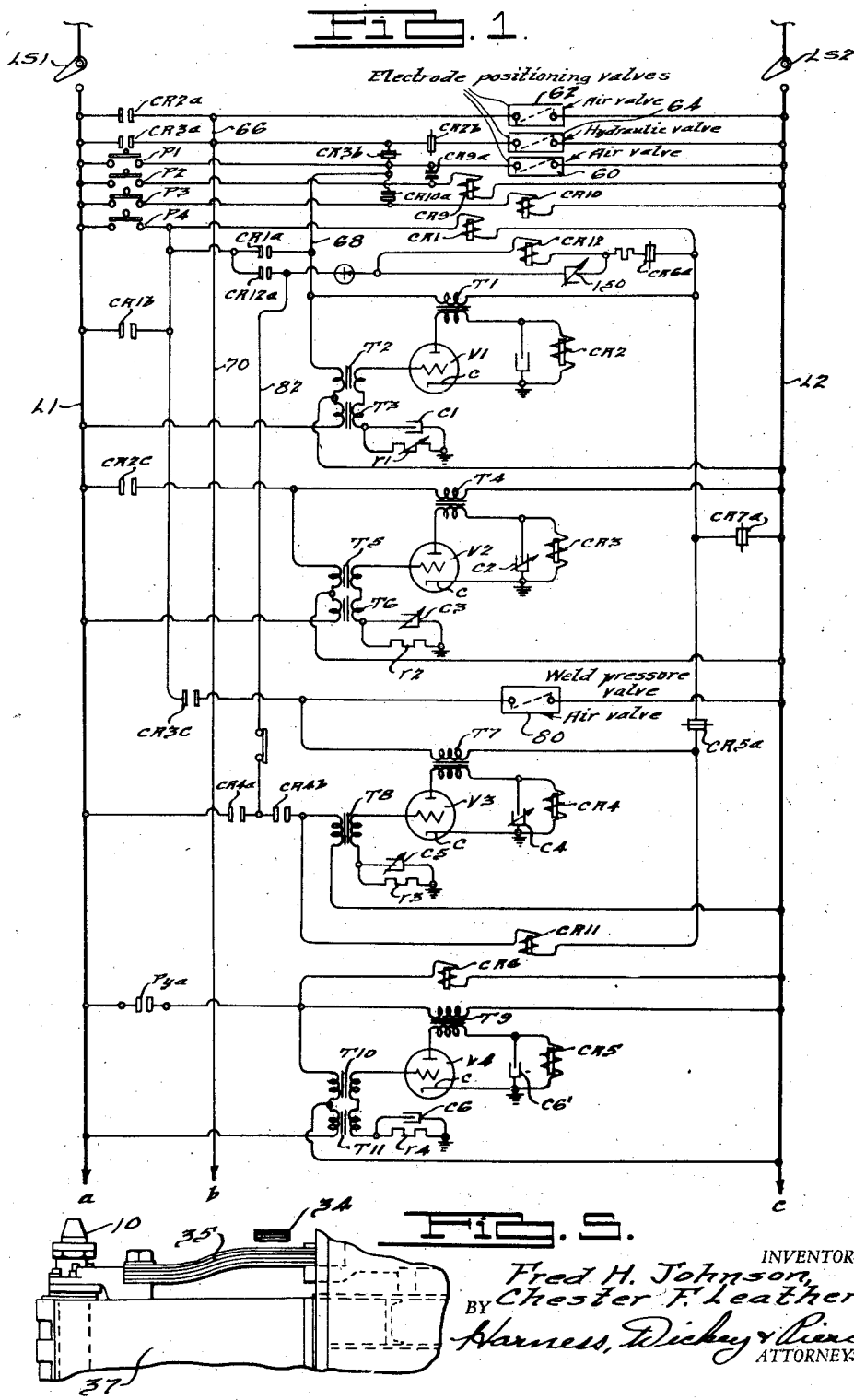

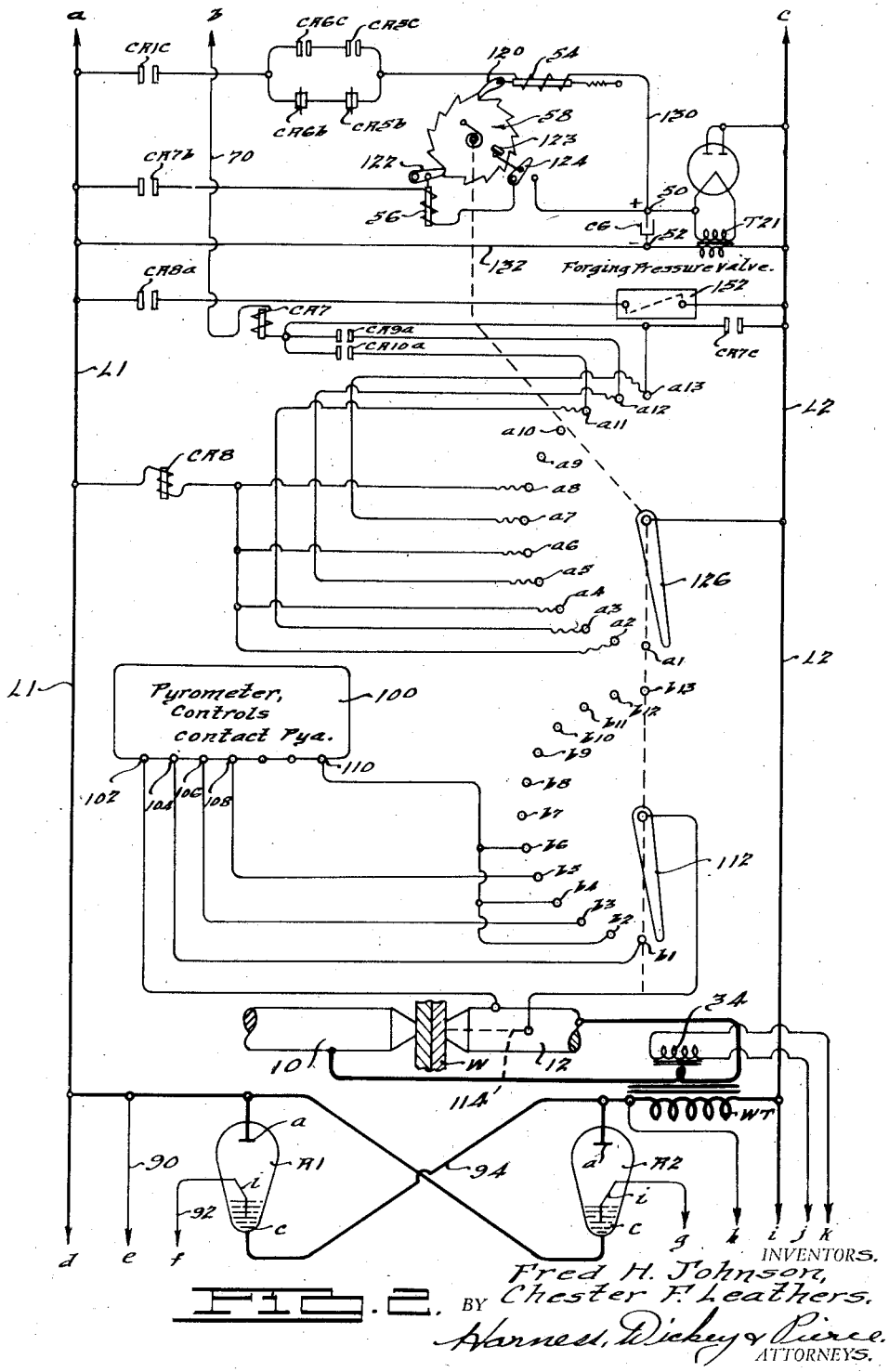

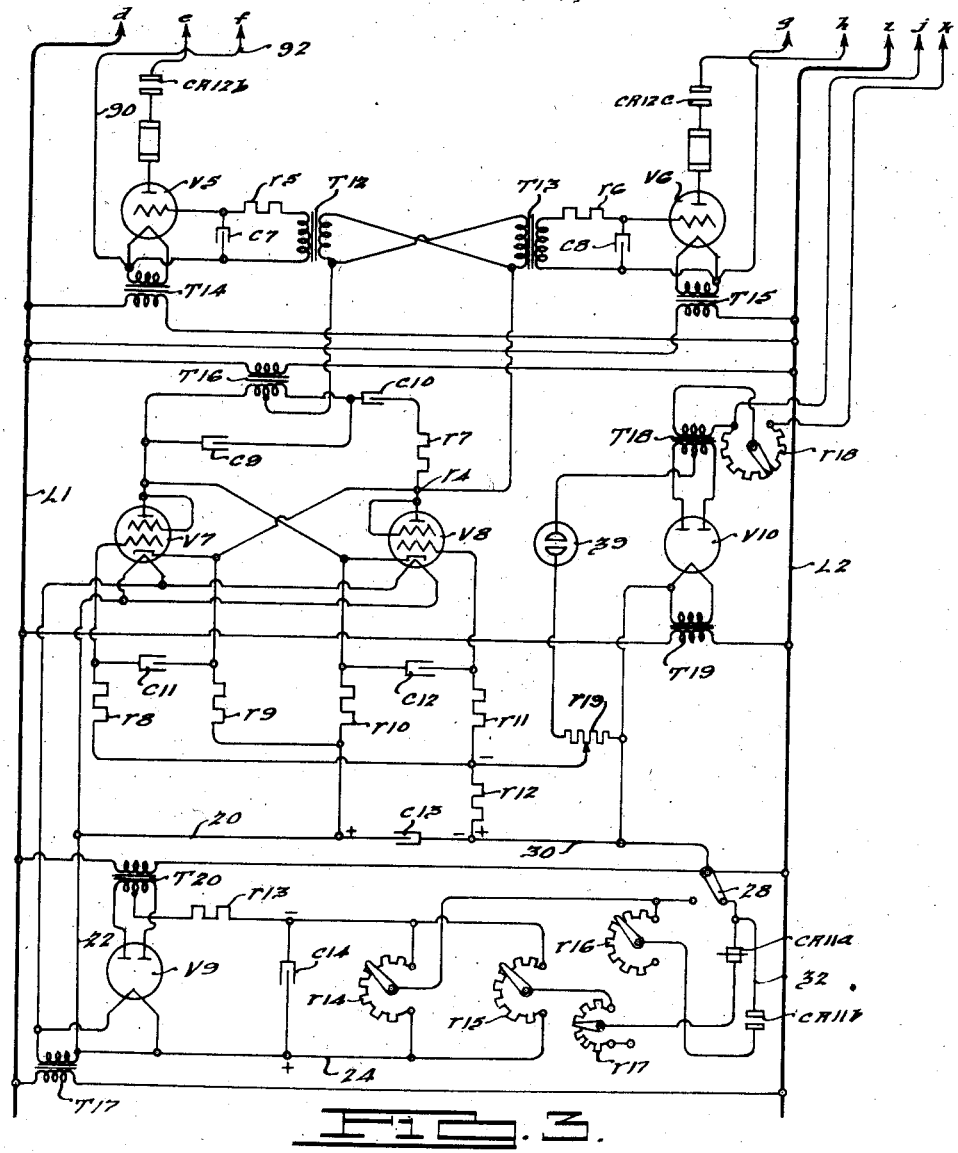
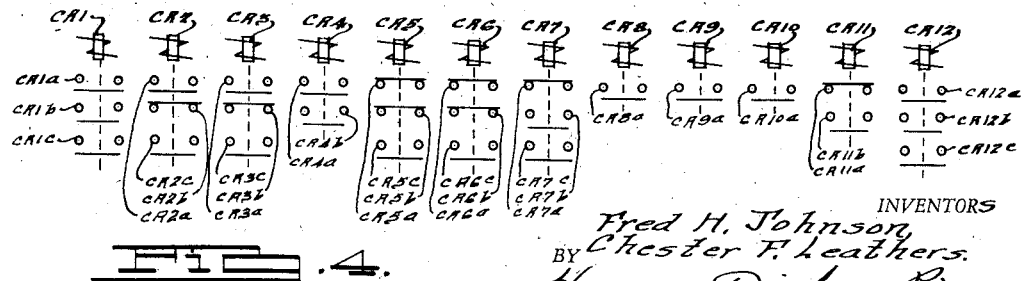

2,429,186

UNITED STATES PATENT OFFICE 2,429,186

APPARATUS FOR WELDING

Fred H. Johnson, Pleasant Ridge, and Chester F. Leathers, Detroit, Mich.; said Leathers assignor to Progressive Welder Company, Detroit, Mich., a corporation of Michigan Application April 3, 1943, Serial No. 481,676

11 Claims. (Cl. 219—4)

The present invention relates to an electrical control system and in particular provides an improved method of and apparatus for electric welding. In certain of its aspects, the present invention represents improvements over the method and apparatus disclosed and claimed in Leathers and Benkert application, Serial No. 447,006, filed June 15, 1942.

The above-mentioned copending application discloses and claims a welding system in which a complete welding cycle includes a succession of heating and cooling stages, each heating stage being terminated when the work attains a desired temperature, and each cooling stage being terminated when the temperature of the work falls to a desired value. In at least one of the stages, the work is brought to a welding temperature, in at least one succeeding stage the work is brought to a temperature within the austenitic temperature range and, preferably, in at least one succeeding stage, the work is brought to a temperature appropriate to an annealing action. In the preferred practice of the above system, each heating stage comprises a succession of heating and cooling periods.

The above system is well adapted to the welding of relatively heavy gauge metals, as well as other applications, and in such cases, the welding current values may be so high that the frequent initiations and interruptions thereof, which take place during the course of a welding cycle, produce undesirable surges in the power system. As disclosed in the copending application, the welding current is caused to automatically increase, during the initial heating period of the initial heating stage, from a minimum value to a maximum value, which action affords a beneficial preheating effect. In accordance with the present invention, it is proposed to eliminate in large part at least the aforesaid undesirable line surges by causing each heating period of each heating stage to begin at a minimum value of current and to increase to and terminate at a maximum value. It is further proposed to cause each cooling period of each heating stage to begin at a maximum value of current and gradually decrease to and terminate at a minimum value of current. With this arrangement, the welding current varies gradually and relatively smoothly between maximum and minimum values, and abrupt changes in current demand are eliminated. It is further proposed to arrange the system so that current is not interrupted at the conclusion of each stage, unless or until the current has fallen to the minimum value.

The use of temperature responsive elements in the aforesaid system not only makes it possible to insure the attainment of a proper succession of temperatures in the successive stages of a cycle, but also serves to compensate for variations in the impedance of the welding circuit encountered in making successive welds. Such impedance changes are produced, as will be understood, by varying physical characteristics of the workpieces, by variations in the degree to which the workpieces are projected into the throat of the welding machine, and by other known factors. The impedance changes serve, of course, to vary the value of the welding current and, consequently, serve to vary the length of time that is required to bring a particular weld zone to a desired temperature. In accordance with the present invention, it is proposed to compensate for such changes in impedance of the welding circuit, so as to reduce the variation in the length of each welding stage. Such action renders more uniform the rate at which successive welds can be made, as will be understood.

With the above as well as other considerations in view, the principal objects of the present invention are to provide an improved method of and apparatus for electric welding, particularly of the resistance type, which is economical, efficient and reliable; to provide such a system wherein, during the course of successive heating and cooling periods, the current is caused to progressively and smoothly vary between desired maximum and minimum values; to provide such a system wherein the current is delivered to the welding circuit through electric discharge apparatus and wherein the variation in the value of the welding current is obtained by phase shifting elements which progressively advance and retire the points in successive half cycles of an alternating current source, at which the discharge apparatus is rendered conductive; to provide such a system wherein means are provided which respond to and compensate for variations in the impedance, or other characteristics, of the welding circuit; to provide such a system wherein the just-mentioned compensation is obtained by providing means which responds to an electrical characteristic of the welding circuit, more particularly the welding current, and which cooperate with the aforesaid phase shifting elements in determining the points in successive half cycles at which the electric discharge apparatus is rendered conductive.

With the above as well as other objects in view, which appear in the following description and in the appended claims, a preferred but illustrative embodiment of the invention is shown in the accompanying drawings, throughout the several views of which corresponding reference characters are used to designate corresponding parts and in which:

Figures 1, 2 and 3, collectively, constitute a diagrammatic illustration of a welding system embodying the invention;

Fig. 4 is a view showing the physical relation between the operating coils and the contacts of the series of electromagnetically operated relays employed in Figs. 1, 2 and 3. In the latter figures, these coils and relays are shown in separated relation, in order to simplify the drawings; and Fig. 5 is a view showing the location of a pickup coil relative to the welding circuit.

It will be appreciated from a complete understanding of the present invention that the improvement thereof may be embodied in widely differing welding systems, particularly adapted for widely varying purposes. It is now preferred to embody these improvements in a multistage welding system of the type described in the aforesaid copending application. In an illustrative but not in a limiting sense, the invention is so disclosed herein.

Before proceeding to a description of the drawings, it is noted that the conductors which terminate in the arrowheads at the bottom of Figure 1 and which are designated, respectively, $a$, $b$ and $c$, are directly connected to the conductors which terminate in the correspondingly designated arrowheads at the top of Figure 2. Similarly, the conductors which terminate in the arrowheads designated $d$, $e$, $f$, $g$, $h$, $i$, $j$ and $k$ at the bottom of Figure 2 are directly connected to the conductors having the correspondingly designated arrowheads at the top of Figure 3.

Referring to the drawings, a usual welding transformer WT is provided with a secondary winding, the terminals whereof are directly connected to the electrodes 10 and 12 of the associated welding machine. The primary winding of the welding transformer is connected across the line conductors L1 and L2, in series with a pair of reversely connected arc discharge devices R1 and R2, which may be and preferably are of the type sold commercially under the trade name "ignitrons." The characteristics of these devices are well known and it is thought they require no description except to note that they are normally non-conductive but that, if an igniting potential is applied between the igniters $i$ and the cathodes $c$ thereof, during a half cycle of the source in which the anodes $a$ thereof are positive, they become conductive and remain so for the balance of the corresponding half cycle of current flow.

In the present system, the points in successive half cycles, of each heating and cooling period of each heating stage, at which the corresponding rectifiers R1 and R2 are rendered conductive, are determined by a pair of heat control valves V5 and V6, associated with the main rectifiers R1 and R2, respectively. Valves V5 and V6 may be and preferably are of a usual three-element, gas-filled type. They are provided with potentiometer type grid control circuits comprising a common supply transformer T16 and individual transformers T12 and T13. The transformer T16 has a usual center-tapped secondary winding connected to one terminal of the primary windings of transformers T12 and T13. The terminals of the secondary winding of transformer T16 are connected together by a bridge comprising a condenser C10, a resistor $r7$ and additional resistance represented by a pair of reversely connected, high vacuum tubes V7 and V8, which may be of a conventional type. The remaining terminals of the primary windings of transformers T12 and T13 are connected to this bridge at the point 14, which is between resistor $r7$ and the plate circuits of valves V7 and V8. It will be noticed, accordingly, that by varying the effective values of resistance represented by valves V7 and V8, the relation between the reactance and resistance in the above-mentioned bridge circuit is varied and, consequently, the phase relation between the voltage of transformer T16 and the voltages of transformers T12 and T13 is correspondingly varied, it being noted that transformers T12 and T13 are connected to the bridge circuit in opposed relation to each other. The characteristics of the bridge and associated circuits are also such that when the resistance of valves V7 and V8 is at a maximum value, the voltages of transformers T12 and T13 reach values sufficiently high to fire their corresponding heat control valves V5 and V6 at a point late in half cycles of the welding current. Similarly, when the resistance of valves V7 and V8 is at a minimum, the voltages of transformers T12 and T13 reach values sufficient to fire valves V5 and V6 at correspondingly earlier points in half cycles. As will be understood, the firing points of valves V5 and V6 and, consequently, of rectifiers R1 and R2 may thus be varied over relatively wide ranges corresponding, for example, from a full heat value to a value down as low as 15% to 20% of full heat.

The grid-cathode circuit of valve V7 includes in series relation a resistor $r8$, a resistor $r12$, across which a phase shift compensating potential is impressed, an impulsing condenser C13, the potential whereof is successively decreased and increased, and a resistor $r9$. In addition, a smoothing condenser C11 is preferably directly connected between the grid and cathode of valve V7. The grid and cathode circuit of valve V8 is similarly connected directly across the compensating resistor $r12$ and the impulsing condenser C13, in series with resistors $r10$ and $r11$. Also, a smoothing condenser C12 is preferably connected directly across the grid-cathode circuit of valve V8.

The potentials of condenser C13 and resistor $r12$ are additive with respect to each other and, consequently, it will be appreciated that the grid-cathode potentials of valves V7 and V8 are at all times equal to the sum of these two potentials. As described below, the potential of condenser C13 predominates and, consequently, when this potential is at a maximum, valves V7 and V8 are of maximum resistance (affording a minimum heat setting for the system) and when this potential is a a minimum, the resistance of valves V7 and V8 is at a minimum (affording a maximum heat setting for the system).

In the present arrangement, the fall and rise of the potential of condenser C13 is controlled by successively commutating its connections to a discharging circuit comprising potentiometer $r14$ and regulating resistor $r16$, and a charging circuit comprising potentiometer $r15$ and a regulating resistor $r17$. The commutation of these circuits is controlled by contacts CR11a and CR11b of trigger relay CR11, it being noted that when contact CR11a is closed, condenser C13 is enabled to charge through a circuit which extends from its positive terminal through conductors 20, 22 and 24, potentiometer $r15$, resistor $r17$, conductor 26, contact $CR11a$, a normally closed transfer switch 28, and conductor 30 to its negative terminal. On the other hand, when relay $CR11$ is energized, its contact $CR11a$ is open and its contact $CR11b$ completes a discharging circuit for condenser $C13$, which includes conductors 20, 22 and 24, potentiometer $r14$, resistor $r16$, contact $CR11b$, conductor 32, switch 28 and conductor 30. It will be noticed, also, that the setting of potentiometer $r15$ determines the maximum voltage to which condenser $C13$ is charged, and that resistor $r14$ determines the minimum voltage to which condenser $C13$ is discharged, both of which values are, of course, obviously adjustable. Resistor $r16$, in series with potentiometer $r14$, serves to variably determine the rate at which condenser $C13$ is discharged from its maximum to its minimum value, and a corresponding control of the charging rate is provided by resistor $r17$.

Potentiometers $r14$ and $r15$ are supplied with voltage from a usual rectifying circuit comprising the continuously energized transformer $T20$ and a usual full wave rectifier $V9$. As illustrated, also, this rectifying circuit includes balancing elements comprising the resistor $r13$ and condenser $C14$.

As described below, relay $CR11$ is energized at the beginning of each heating period of each heating stage, and is de-energized at the beginning of each corresponding cooling period. During each such heating period, the welding current, consequently, rises from a minimum to a maximum value and during each such cooling period, the current falls from the maximum to the minimum value. The rate of change of the current value may be adjusted, as aforesaid, so as to cause the maximum and minimum values, respectively, to be attained at desired points in the corresponding heating and cooling periods. In general, it is preferred to adjust the minimum value to correspond to approximately 20% of full heat, full heat being defined as usual as being attained by firing the main rectifiers at the power factor angle of the system. Depending upon the current requirements of the welding load, the maximum value of the heat setting may fall anywhere between 50% and 100% of full heat although, when utilized in connection with the hereinafter described phase-shift compensating elements, it is preferred to limit the maximum heat, as determined by potentiometer $r14$, to between 80% and 90% of full heat, in order to allow a sufficient range for the action of the phase shift compensating elements.

It will be appreciated from the foregoing, that a given heat setting or grid-cathode potential of valves $V7$ and $V8$ causes the main rectifiers to be fired at corresponding predetermined points in successive half cycles and, consequently, causes, for a given value of impedance in the welding circuit, a corresponding value of welding current to flow. If, on the other hand, the impedance of the welding circuit is varied (as might be caused, for example, by moving the work a greater or lesser distance into the throat of the machine so as to space the welds farther from or nearer to the edge of the work), the same heat setting is effective to produce a different value of welding current. It is the function of the potential impressed across the phase-shift compensating resistor $r12$ to compensate for such changes.

As shown, resistor $r12$ is connected, through an adjustable resistor $r19$ and a glow discharge valve 39, to receive the direct current output of a usual full-wave rectifier comprising transformer $T18$ and rectifier $V10$. The primary winding of transformer $T18$ is connected to a potentiometer $r18$ which, in turn, receives the output of a pick-up winding 34 (Figs. 2 and 5). Winding 34 is located in the throat of the welding machine, immediately adjacent one of the bus bars, which extends between one of the electrodes and the corresponding secondary terminal of welding transformer $WT$. With this relation, it will be appreciated that the E. M. F. of winding 34 is directly determined by and is proportional to the current flowing in the welding circuit. Moreover, by adjusting potentiometer $r18$, the rectified potential applied to valve 39 may be varied with respect to the potential developed by the pick-up winding 34, and valve 39 may, consequently, be caused to break down at a value of welding current corresponding, for a given value of welding current impedance, to a desired percentage of full heat. Further, by adjusting potentiometer $r19$, a desired percentage of the rectified voltage may be impressed across resistor $r12$. It is now preferred to use an adjustment which causes valve 39 to break down at a value of welding current corresponding to a maximum impedance in the welding circuit and to the maximum heat setting, as determined by potentiometer $r14$, and which further causes the resultant potential impressed across resistor $r12$ to be approximately 10% of the potential of condenser $C13$.

It is thought that the remaining details of the operation of the automatic heat changing elements and the compensating elements, as well as the other details, which have to do with the mechanical operation of the machine, the control of the length of the cycle as a whole, the control of the several heating and cooling stages, and the control of the lengths of the heating and cooling periods of each stage may best be understood from a description of the operation of the system as a whole. It is noted that the system as a whole, except in the respects which afford the phase shift compensation and the progressive change in heat setting during successive heating and cooling periods is substantially the same, unless noted otherwise, as the system disclosed in the aforesaid copending Leathers and Benkert application.

Assuming it is desired to effect a welding operation, the system may be conditioned for operation by closing the illustrative line switches $LS1$ and $LS2$, which connects line conductors $L1$ and $L2$, in each of Figs. 1, 2 and 3, to a usual alternating current source of supply. Upon being energized, line conductors $L1$ and $L2$ complete obvious energizing circuits in Fig. 1, for the primary windings of transformers $T3$, $T6$ and $T11$, associated, respectively, with valves $V1$, $V2$ and $V4$. These valves, as well as valve $V4$, may be and preferably are of the usual three-element, high vacuum type and, as will be understood, they may be provided with usual heating circuits which bring the cathodes $c$ thereof to emissive temperatures. These heating connections have been omitted from the drawings to simplify them. Upon being energized, transformers $T3$, $T6$ and $T11$ apply blocking potentials to the grids of the associated valves, and also charge up the associated grid condensers $C1$, $C3$ and $C6$. These actions serve to render the corresponding valves non-conductive, as will be understood.

In Fig. 2, the energization of line conductors L1 and L2 supplies energy to transformer T21 which, through a usual full wave rectifier, applies a D. C. potential between terminals 50 and 52, thereby affording a source of direct current for operating the windings 54 and 56, associated with the ratchet unit 58.

In Fig. 3, the energization of line conductors L1 and L2 supplies, through obvious circuits, energizing current for the filament transformers T14, T15 and T18, associated with the filament circuits of valves V5, V6 and V10. An obvious circuit is also completed for transformer T17, which supplies filament current for valves V7, V8 and V9.

The energization of line conductors L1 and L2 (Fig. 3) also energizes transformer T20, which thereupon, through rectifier V9, applies a fixed potential across potentiometers $r14$ and $r15$, which action results in charging condenser C13 to its maximum value, the charging circuit extending through resistor $r15$ and the now closed back contact CR11a of relay CR11. Under the conditions stated, no potential is applied across resistor $r12$ and, consequently, the grid-cathode potentials of valves V7 and V8 are directly determined by the potential of condenser C13. Being at a maximum value, substantially a maximum resistance is afforded by valves V7 and V8.

The energization of line conductors L1 and L2 (Fig. 3) also energizes transformer T16, which, through the previously described bridge circuit, energizes grid transformers T12 and T13 associated with valves V5 and V6. These potentials, which are at a phase position corresponding to approximately a minimum heat setting of the system, tend, during successive half cycles, to fire valves V5 and V6. Under the conditions stated, however, the plate circuits of these valves are interrupted at the now open contacts CR12a and CR12b of relay CR12, so that no current is passed by these valves.

Assuming it is desired to effect a welding operation, the workpieces W may be introduced between the electrodes 10 and 12, after which the pilot switch P1 may be closed. Closure of this switch may in any desired manner serve to cause the electrodes to move into clamping engagement with the work. In the illustrated system, it is assumed that the welding machine embodies the combined air and hydraulic electrode control mechanism described and claimed in the copending application of Hugo Purat, Serial No. 466,981, filed November 23, 1942, now Patent No. 2,413,783, dated Jan. 7, 1947, which mechanism includes air valves 60 and 62 and a hydraulic valve 64, the sequencing of which is briefly described herein and is more completely described in the copending application. Briefly, closure of pilot switch P1 directly energizes air valve 60 and, through the now closed back contacts CR3b and CR2b, also energizes hydraulic valve 64. Further, through the now closed contact CR3b and conductor 66, such action energizes the other air valve 62. As is described in more detail in the Purat application, the energization of these three valves applies pressure to the electrodes and causes them to move into clamping engagement with the work.

Closure of pilot switch P1, also, through conductor 68, directly energizes transformers T1 and T2, associated with valve V1. Upon being energized, transformer T2 opposes the previously energized blocking transformer T3 and enables the energy stored in condenser C1 to discharge through the associated resistor $r1$. At the expiration of a discharge period, proportioned to be long enough to enable the full movement of the electrodes into the clamping position, valve V1 becomes conductive, enabling the now energized plate transformer T1 to pass current therethrough and energize control relay CR2. Upon being energized, relay CR2 closes its contacts CR2a and CR2c and opens its back contact CR2b. Closure of contact CR3a prepares a circuit through conductor 70, which extends through to Figure 2, for control relay CR7, which action is without immediate effect, and also makes a holding circuit for air valve 62. The opening of contact CR2b de-energizes the hydraulic valve 64, which prepares the system for the application of the normal or welding pressure, but is otherwise without effect, in so far as the operations pertinent to the present invention are concerned. So long, accordingly, as pilot switch P1 is held closed, the electrodes remain in engagement with the work with a light or preliminary pressure.

The above-mentioned closure of contact CR2c completes energizing circuits for transformers T4 and T5 associated with the anode and grid circuits of valve V2. Upon being energized, transformer T5 opposes transformer T6 and enables the energy stored in condenser C3 to discharge through the local circuit including resistor $r2$. After a corresponding discharge period, the grid of valve V2 attains a potential at which this valve is conductive, enabling transformer T4 to pass current therethrough and energize control relay CR3. Upon being energized, relay CR3 closes its contacts CR3a and CR3c and opens its back contact CR3b. The latter action is without effect, since valve 62 is maintained energized through the now closed contacts CR2a and CR3a and valve 60 is maintained energized through the still closed switch P1.

Closure of contact CR3c prepares a circuit for the welding pressure valve 80 and for transformer T7, which circuits remain incomplete, however, pending initiation of the actual welding cycle. The purpose of the contact CR3c is to prevent application of the weld pressure unless and until the means which responds to valves 60, 62 and 64 has had time to bring the electrodes into engagement with the work, and the timing of condenser C3 is, of course, adjusted to insure this relation.

Assuming it is desired to initiate the weld, any one of the three pilot switches P2, P3 or P4 may be closed, depending upon the number of stages which it is desired to include in the full welding cycle. In the illustrated system, switch P4 is effective to produce a cycle having three stages, for example, a welding stage, a grain refining stage (carried into the austenitic temperature range) and an annealing stage. Closure of switch P2 is effective to produce the same cycle except that the annealing stage is omitted, and switch P3 is effective to produce a cycle in which both the annealing and grain refining stages are omitted, leaving only a welding stage.

Assuming switch P4 is closed, to produce the full three stage cycle, such action directly completes a circuit for relay CR1, subject only to the now closed back contact CR7a of relay CR7. Upon being energized, relay CR1 closes its contacts CR1a, CR1b and CR1c. Contact CR1b directly completes a holding circuit for relay CR1, in parallel with switch P4, which may thereupon be released to the open position without affecting the cycle now in progress; and in conjunction with contact CR1a, completes a holding circuit for air valve 60.

The closure of switch P4 also completes a circuit (which is held closed after the opening of switch P4 by contact CR1b) for the weld pressure valve 80 and transformer T7 associated with valve V3. Upon being energized and in the manner described in the aforesaid Purat application, weld pressure valve 80 increases the pressure on the electrodes to a value suitable for welding purposes, thus placing the system in condition for the actual initiation of the flow of welding current.

Upon being energized, transformer T7 applies anode potential to the normally conductive valve V3 and passes current therethrough to energize control relay CR4. Upon being energized, relay CR4 closes its contacts CR4a and CR4b, which contacts are connected in series relation with each other. Closure of contact CR4a completes a circuit through conductor 82 for the coil of relay CR12, which circuit also includes, in series relation, the now closed back contacts CR6a and CR7a of relay CR6 and CR7. Closure of contact CR4a in conjunction with contact CR4b energizes the previously identified phase shifting relay CR11, through a circuit which includes, in series relation, the now closed back contacts CR5a and CR7a of relay CR5 and CR7.

Upon being energized, relay CR12 closes its contacts CR12a, CR12b and CR12c. Contact CR12a completes a self-holding circuit for relay CR12, which holding circuit, however, includes the now closed contact CR1b of relay CR1. Closure of contacts CR12b and CR12c (top of Fig. 3) applies anode potential to the firing valves V5 and V6. The circuit for valve V5 extends from line conductor L1 through conductor 90 (bottom of Fig. 2 and top of Fig. 3), valve V5, contact CR12b, conductor 92 (bottom of Fig. 2 and top of Fig. 3), igniter i and cathode c of main rectifier R1, and thence through conductor 94 and the primary of the welding transformer WT to line conductor L2. Closure of contact CR12c completes a similar circuit through which potential is applied across valve V6 and it will be noted that in these circuits, valves V5 and V6 are connected, respectively, in parallel with the anode-cathode circuits of main rectifiers R1 and R2.

It will be recalled from previous description that, during each successive positive half cycle and, with the initial adjustment of the system, at a point therein which corresponds to about 20% full heat, transformer T12 applies a conductive potential to the grid of valve V5, tending to render this valve conductive. At a corresponding point in each negative half cycle, a conductive potential is applied to the grid of valve V6 by transformer T13. Depending upon whether the closure of contacts CR12b and CR12c takes place during a positive or a negative half cycle, therefore, either main rectifier R1 or main rectifier R2 is the first main rectifier to be fired. Assuming such closure occurred during a positive half cycle, the potential applied to valve V5 passes current therethrough and passes an igniting current between the igniter i and the cathode c of rectifier R1, which action, as will be understood, fires this valve and initiates the flow of welding current. At the corresponding point in the succeeding negative half cycle, rectifier R2 is fired through valve V6 and so long, therefore, as contact CR12b and CR12c remain closed, rectifiers R1 and R2 are effective to pass current to the welding circuit at a heat setting determined by the phase shift adjustment of transformers T12 and T13.

Upon being energized, as aforesaid, and simultaneously with the energization of relay CR12, relay CR11 opens its back contact CR11a and closes its front contact CR11b. The former action interrupts the circuit for condenser C13, which includes the minimum heat setting potentiometer r15. On the other hand, closure of contact CR11b completes the previously described discharge circuit for condenser C13, which circuit includes potentiometers r14 and r16 and through which circuit condenser C13 is enabled to gradually discharge to the minimum potential determined by potentiometer r14, at a rate determined by resistor r16. In response to this action, the potential across condenser C13 gradually falls from its normal or maximum value towards its minimum value. The progressive decrease in potential across condenser C13 is reflected as a decrease in the negative grid bias potential of valves V7 and V8, which action correspondingly and gradually decreases the resistance of these valves and alters the ratio of reactance to resistance in the bridge circuit to which transformers T12 and T13 are connected. As aforesaid, this shift gradually advances the points in successive positive and negative half cycles at which valves V5 and V6 are rendered conductive. This, in turn, advances the point in such half cycles at which rectifiers R1 and R2 are fired, and correspondingly increases the value of the welding current.

In addition to the operations described above, closure of contacts CR4a and CR4b of relay CR4 completes an energizing circuit for the grid transformer T8 associated with valve V3, which action blocks this valve and interrupts the supply of current to relay CR4 from anode transformer T7. In response to this action, the energy stored in the coil of relay CR4 starts to discharge through the associated condenser C4 and at the expiration of a predetermined heating period, relay CR4 resumes the de-energized position, opening its contacts CR4a and CR4b. In view of the holding circuit afforded by contact CR12a, this action is without effect on the starting relay CR12, which, consequently, continues to maintain anode potentials on firing valves V5 and V6. The opening of contacts CR4a and CR4b does, however, de-energize relay CR11, which thereupon re-opens its contact CR11b and recloses its contact CR11a. The former action interrupts the previously described discharge circuit for condenser C13. Reclosure of contact CR11a recompletes the original charging circuit for condenser C13, through potentiometer r15, initiating a gradual charging of condenser C13 and a consequent gradual increase in the grid-cathode potentials of valves V7 and V8. This action progressively increases the resistance of these valves and, consequently, progressively retires the firing points of the main rectifiers R1 and R2.

The opening of contacts CR4a and CR4b also de-energizes grid transformer T8, enabling the energy now stored in condenser C5 to start discharging through the local circuit, including resistor r3. At the expiration of a predetermined discharge period, valve V3 again becomes conductive, enabling transformer T7 to re-energize relay CR4. This action duplicates the action which resulted from the initial energization of relay CR4 in so far as concerns the progressive advance of the heat setting of valves V5 and V6, but does not affect relay CR12, since this relay is already energized. The re-energization of relay CR4 also re-energizes transformer T8 and applies a blocking potential to the grid of valve V3. This action again initiates a timing out of relay CR4, at the expiration of which it resumes the de-energized position and initiates a retirement of the heat setting of valves V5 and V6. So long, therefore, as transformer T7 remains energized, relay CR4 pulsates between an energized position and a de-energized position, the energized interval being determined by condenser C4 and the de-energized interval being determined by condenser C5. Each energized interval, in turn, affords a heating period during which the heat setting of valves V5 and V6 is increased from a minimum to a desired maximum and each de-energized interval affords a cooling period during which the heat setting of these valves is retired from the desired maximum to the minimum. As will be understood, depending upon the relative durations of the energized and de-energized intervals of relay CR4, and the charging and discharging times of condenser C13, all or any desired part of each heating period may be utilized to bring the welding current from the minimum to the maximum and all or any desired part of each cooling period may be utilized to bring the welding current from the maximum to the minimum. In most cases, an adjustment is used in which current flows at the maximum value for a substantial part of each heating period and flows at a minimum value for a substantial part of each cooling interval, it being understood that the term "cooling period" is herein used in accordance with trade usage as referring to the relation between the electrodes and the work rather than to temperature conditions at the junction between the workpieces.

As thus far described, accordingly, closure of the pilot switches P1 and P4 has brought the electrodes into engagement with the work with a welding pressure, and has initiated a flow of welding current to the work, which flow of welding current pulsates between minimum and maximum values, which action continues until interrupted by the temperature responsive elements described below, which, in conjunction with the ratcheting device 58, serve to determine the number of stages, temperatures attained in the successive stages and the temperatures attained in the intervals between successive stages.

The temperature responsive apparatus may be and preferably is arranged, as described in detail in the aforesaid Leathers and Benkert application and, in order to simplify the drawings and description, this apparatus is diagrammatically shown in Fig. 2 as a pyrometer element 100, having an input terminal 102, which is directly connected to the electrode 12 and having a series of four input terminals 104, 106, 108 and 110. Terminals 104, 106 and 108 are connected, respectively, to terminals b1, b3 and b5 of a commutator operated by the above-mentioned ratchet unit 58. The remaining terminal 110 is connected to commutator terminals b2, b4 and b6. The arm 112 of the commutator unit is connected to a thermocouple element 114 such, for example, as constantan, which is embedded in the electrode 12 in the manner described in the Leathers and Benkert application. The constantan and electrode 12 cooperate to form a thermocouple which responds to the temperature attained at the junction between the work and the electrode 12, which relationship is generically referred to herein as the temperature of the work. It will be understood that the pyrometer 100 is provided with adjusting elements, not shown herein, which cause it to correspond to a succession of different temperatures, depending upon which one of the commutated input terminals 104, 106, 108 or 110 the common terminal 102 is connected to. When terminal 102 is connected to terminal 104, these internal adjustments cause the pyrometer to respond to a temperature corresponding to a welding temperature at the junction between the workpieces. When terminal 102 is connected to terminal 106, the pyrometer responds to a temperature falling in the austenitic temperature range, appropriate to a grain refining heat of the work. When the terminal 102 is connected to terminal 108, the pyrometer responds to a temperature appropriate to an annealing operation, which temperature, for example, may be in the immediate region of or somewhat below the so-called critical temperature of the work. When the terminal 102 is connected to terminal 110, the pyrometer responds to a relatively low temperature well below the annealing temperature of the work and this is the temperature to which the work is allowed to fall in the intervals between successive stages.

Each time one of the aforesaid adjusted temperatures is attained, causing the pyrometer to respond, it closes its sole contact, designated PYa near the bottom of Fig. 1, which action, as described below, terminates the heating stage then in progress. Each time the contact PYa opens, a corresponding cooling stage is terminated.

The ratchet element 58 may and preferably does correspond to the similar element described in the Leathers and Benkert application and comprises a toothed drum which is continuously urged in a clockwise direction by a coil spring. The drum is provided with an advancing pawl 120, controlled by a solenoid 54 and is provided with a resetting pawl 122, controlled by a solenoid 56. In addition, the drum has associated with it a limit switch 124, which is disposed to be opened by it when and so long as the drum occupies the normal or starting position, in which the associated commutator arms 126 and 112 occupy the illustrated positions out of engagement with the terminals disposed to be engaged thereby. The terminals a1, a2, etc., associated with arm 126, are associated with the high pressure or forging relay CR8, the action of which is described below.

Continuing now with the description of the operation, the initial energization of relay CR1, which results from the closure of pilot switch P4 at the beginning of the welding cycle, also causes this relay to close its front contact CR1c. This action completes a circuit through the now closed series connected back contacts CR8b and CR5b for the winding 54, associated with the advancing pawl of the ratchet unit. This circuit serves to apply the rectified potential between terminals 50 and 52 to winding 54, through conductors 130, 132, a portion of line conductor L1 and the above-mentioned contacts. Upon being energized, winding 54 advances pawl 120 and moves the ratchet unit to its first operating position, in which arms 112 and 126 engage terminals b1 and a1, respectively. The latter engagement is without effect, but the former engagement connects input terminals 102 and 104 to the thermocouple afforded by the electrode 12 and the embedded element 114. The continuing flow of welding current initiated, as described above, causes the temperature of the work to progressively rise, which rise in temperature, taking place during the course of successive pulsations of the current between the aforesaid maximum and minimum values, is reflected as an increasing thermoelectric E. M. F. between terminals 102 and 104. When this temperature reaches a welding value, appropriate to the formation of a weld nugget between the workpieces, pyrometer 100 responds and immediately closes its contact PYa. Referring to Fig. 1, this action immediately energizes relay CR6 and transformers T9 and T10, associated with valve V4. Upon being energized, relay CR6 opens its contacts CR6a and CR6b and closes its contact CR6c. The opening of contact CR6a interrupts the originally traced energizing circuit for relay CR12, which relay does not immediately drop out, however, because of the holding action of condenser 150, connected in parallel with the coil thereof. The opening of contact CR6b interrupts the previously traced energizing circuit for solenoid 54, enabling the spring associated with pawl 120 to withdraw it to a position in which it engages behind the next successive tooth of the ratchet drum, this action being preparatory to an advancing movement of the ratchet unit.

Upon being energized, transformer T10 opposes the continuously energized transformer T11 and enables the energy stored in condenser C6 to discharge through the local circuit comprising resistor r4. At the expiration of a short interval, of the order of a cycle or two, sufficient only to allow the above-mentioned withdrawal of the pawl 120, valve V4 becomes conductive. This action enables transformer T9 to pass current therethrough and energize relay CR5, which thereupon opens its contacts CR5a and CR5b and closes its contact CR5c. The opening of contact CR5b is without immediate effect, since contact CR6b is now open, but the closure of contact CR5a completes a circuit, through contacts CR1c and CR6a, for winding 54, which thereupon actuates pawl 120 and advances the ratchet unit to its second position in which arm 112 engages terminal b2 and arm 126 engages terminal a2.

The latter action completes a circuit for relay CR3, which thereupon closes its sole contact CR3a (near the top of Fig. 2). This action energizes the forging pressure valve 152, resulting, as described in the aforesaid Purat application, in the application to the work of a substantially higher or forging pressure.

The transfer movement of arm 112 interrupts the input circuit between terminals 102 and 104 and completes an input circuit between terminals 102 and 110. This transfer movement is quite rapid and, due to the sluggish character of the pyrometer 100, is completed before contact PYa has an opportunity to open. As soon as the transfer movement is completed, the pyrometer is readjusted to a materially lower temperature, as aforesaid, and consequently maintains its contact PYa closed until such materially lower temperature is attained.

The opening of contact CR5a immediately interrupts the energizing circuits for transformer T7 and for phase shifting relay CR11. It will be noted that this action may take place either during a heating period or during a cooling period, since it is found in practice that the temperature of the work may continue to build up at least throughout the initial portion of a cooling period. Consequently, the critical operating temperature, at which the pyrometer responds, may be attained during a cooling period. If the pyrometer responds, during a cooling period, the opening of contact CR5a is without immediate effect, since under these conditions, relays CR4 and CR11 are already de-energized and the phase shifting elements comprising condenser C13 are already proceeding to reduce the value of welding current towards its minimum value. In such instance, the opening of contact CR5a serves only to prevent the re-energization of relays CR4 and CR11 and, consequently, prevents the initiation of a heating period at the conclusion of the cooling period then in progress.

On the other hand, if the pyrometer responds during a heating period, the consequent opening of contact CR5a immediately de-energizes relay CR11 and initiates a retirement of the phase shift position. This action takes place regardless of whether the current has yet attained its maximum value or is of only an intermediate value. In such case, the opening of contact CR5a initiates a gradual reduction in the current and also, as before, prevents the initiation of a succeeding heating period. In such case, also, the de-energization of transformer T7 is without immediate effect on relay CR4 because of the holding action of condenser C4, but does prevent the re-energization of relay CR4.

The minimum value of welding current is well below the value needed to maintain the work at the welding temperature, and, consequently, the operation of the pyrometer, as aforesaid, initiates a cooling off of the work. To hasten this cooling action, it is preferred to completely interrupt the flow of welding current and for this purpose, as aforesaid, the operation of the pyrometer serves to interrupt the initial energizing circuit for the starting relay CR12. The condenser 150 associated with this relay, however, maintains it in the energized position long enough to allow the phase shifting elements to reduce the current to its minimum value. Condenser 150 is, consequently, preferably adjusted to give a holding interval slightly longer than the time required to allow phase shifting condenser C13 to discharge from its maximum potential to its minimum potential. When the temperature of the work has fallen to the aforesaid low value, well below the annealing temperature of the work, the pyrometer contact PYa resumes its open position, which action immediately de-energizes relay CR6, transformer T9 and transformer T10. The de-energization of relay CR6 causes its contacts CR6a, CR6b and CR6c to resume the illustrated positions. Contact CR6a, upon reclosure, again prepares a circuit for the starting relay CR12, which circuit, however, remains open at contact CR4a. Reclosure of contact CR6b prepares the original energizing circuit for ratchet winding 54, and the opening of contact CR6a interrupts the last traced circuit for winding 54. In response to this action, pawl 120 is withdrawn to a position in which it engages behind the next ratchet tooth, preparatory to the next ratcheting step.

The de-energization of transformer T10 enables the continuously energized transformer T11 to apply a blocking potential to the grid of valve V4, which action interrupts the original energizing circuit for relay CR5 and enables the energy stored in the coil thereof to discharge through the local circuit comprising condenser C6'. At the expiration of a short period, sufficient only to allow the above resetting movement of the ratchet pawl 120, relay CR5 resumes the de-energized position, restoring its contacts CR5a, CR5b and CR5c to the illustrated positions. The transfer action of contacts CR5b and CR5c recompletes the original energizing circuit for winding 54, which thereupon acts to advance the ratchet drum to the third operating position in which arms 112 and 126 engage terminals b3 and a3, respectively.

When arm 126 moves away from terminal a2, it interrupts the circuit for relay CR8, which thereupon resumes the de-energized position. This action de-energizes the forging pressure valve 152, restoring the electrode pressures to the lower or welding value. In the sequence now being described, the engagement of terminal a3 by arm 126 is without effect.

The engagement of arm 112 with terminal b2 connects terminals 102 and 106 to the thermocouple, which terminals, as aforesaid, adjust the pyrometer to a temperature appropriate to a grain refining heat. This adjustment makes no change in the now open position of the pyrometer contact PYa, since this grain refining temperature is well above the pre-existing temperature of the work.

The reclosure of contact CR5a completes the original energizing circuit for transformer T7, associated with valve V3. Upon completion of this circuit, relay CR4 is again energized and initiates the second heating stage in the manner described with reference to the first stage. It is believed that it will be evident that during this second stage, relay CR11 is again pulsated between energized and de-energized conditions, so as to provide successive heating and cooling periods in the same manner that these periods are provided during the initial or welding stage. Also, when the work attains the grain refining temperature, the pyrometer responds, as before, to initiate the second cooling stage. In this case, the initiation of the second cooling stage involves advancing the ratchet arms into engagement with terminals b4 and a4, respectively. The latter action again energizes the forging pressure relay CR8, which acts to apply the forging pressure to the work. The engagement of terminal b4 again adjusts the pyrometer for its minimum temperature corresponding to the temperature attained at the expiration of the first cooling stage.

At the expiration of the second cooling stage, also, the third heating stage is initiated in the same manner that the second stage was initiated, except that in this case, the ratchet arms advance into engagement with terminals b5 and a5, respectively, it being understood that terminal b5 adjusts the pyrometer for the third or annealing stage.

During the course of the third heating stage, relay CR11 is again pulsated in the previously described manner, it being noted, of course, that the second stage may be expected to include fewer heating and cooling periods than the first stage, and that the third stage may be expected to include fewer such periods than the second stage.

The third cooling stage also proceeds in the previously described manner and at the conclusion thereof the system is reset to its original condition as follows:

When the minimum temperature corresponding to the pyrometer input terminal 110 is reached, the pyrometer contact PYa again opens and, as before, by virtue of the reclosing of contacts CR6b and CR5b, the ratcheting unit is advanced to its seventh position, in which the arms 126 and 112 engage terminals a7 and b7. The terminal b7 is an inactive terminal in the operation now being described.

The movement of arm 126 out of engagement with terminal a6 again de-energizes the forging pressure relay CR8, restoring the electrode pressure to the normal or welding value. Its movement into engagement with terminal a7 completes the circuit, subject to the now closed parallel-connected contacts CR2a and CR3a (top of Fig. 1) for the resetting relay CR7. In response to this action, relay CR7 assumes the energized position, closing its contacts CR7b and CR7c and opening its contact CR7a. The opening of contact CR7a immediately interrupts the circuits for relays CR1, CR12 and CR11, and also interrupts the circuits for anode transformers T1 and T7, associated, respectively, with valves V1 and V3. The interruption of the circuits for relays CR12 and CR11, at contact CR7a, prevents the re-energization of these relays, which re-energization normally occurs at the expiration of a cooling stage, and thus terminates the welding cycle. Closure of contact CR7b completes a circuit for the resetting winding 56, associated with the ratchet unit, which thereupon withdraws the pawl 122 from engagement with the ratchet drum, preparatory to the return movement of the drum.

It is to be noted that the de-energization of relay CR5, which resulted from the opening of contact PYa at the conclusion of the final cool period, not only energizes relay CR7, as aforesaid, but, at contact CR5a, tends also to recomplete the circuit for transformer T7, thereby tending, through the consequent sequential energization of relays CR4, CR11 and CR12, to re-initiate the flow of welding current. Such recompletion may be prevented by providing a slight delay in the closing movement of contact CR5a, sufficient to enable the opening of contact CR7a to precede such closure. Even in the absence of such time delay on contact CR5a, the recompletion of the circuit for transformer T7 is of a momentary character only. In practice it is found that by virtue of its relatively heavier character, the starting contactor CR12 does not have time to reach the closed position before its circuit is opened by the opening of contact CR7a. If desired, suitable means may be provided to delay the closure of contactor CR12. For example, such means may comprise the condenser 150, which may be properly related to the other constants of the associated circuit so as to afford a desirably short closing time delay and still afford the previously described desired delay in the opening of contactor CR12 at the conclusion of the respective heat stages.

Continuing with the resetting action, the de-energization of relay CR1 causes its contacts CR1a, CR1b and CR1c to re-open. The latter contact de-energizes operating winding 54 of the ratchet unit, and enables the associated return spring to restore it to the illustrated starting position, in which the arms 126 and 112 are out of engagement with their associated commutator terminals. At the conclusion of this return movement, the cam 123 on the ratchet drum opens the limit switch 124, thereby de-energizing the reset winding 56.

The return sweep of the arm 112 sequentially re-connects the terminals 110, 108, 106 and 104, which action is, however, without effect, since the work is now below the temperatures to which these terminals correspond. The return sweep of the arm 126 causes it to momentarily complete circuits for the forging pressure relay CR8, but this return movement is so rapid that the relay does not remain energized long enough to have any effect. The return sweep of the arm 126 also interrupts the initially traced circuit for relay CR7, which action is, however, without effect in view of the holding effect of the now closed contact CR7c, which is connected in parallel with arm 126.

Contacts CR1a and CR1b, in opening, further interrupt the circuit for transformer T1 and also interrupt the previously traced holding circuits in parallel with the pilot switches P1 and P4. In addition, the opening of contact CR1b interrupts the circuit for the welding pressure valve 80, which thereupon relieves the welding pressure from the work and restores this pressure to the initial low value.

The opening of contacts CR1a and CR1b also interrupts the remaining energizing circuit for the winding of the valve 60. This action, as described in the Purat application, is preparatory to the return or separating movements of the electrodes.

The de-energization of transformer T1 de-energizes control relay CR2, which thereupon resumes the de-energized position, opening its contacts CR2a and CR2c and reclosing its contact CR2b. The re-opening of contact CR2a is without effect, but the closure of contact CR2b recompletes a circuit for the hydraulic valve 64, which action, in conjunction with the de-energization of valve 60, serves, as described in the Purat application, to separate the electrodes from the work. The opening of contact CR2c interrupts the circuits for transformers T4 and T5, associated with valve V2 and control relay CR3. These actions cooperate to interrupt the flow of current to relay CR3, whereupon the energy stored in the coil thereof starts to discharge through the associated condenser C2. At the expiration of a relatively short period, sufficiently long to enable the full separating movement of the electrodes to take place, relay CR3 resumes the de-energized position, opening contacts CR3a and CR3c and reclosing contact CR3b. The opening of contact CR3c and the closure of contact CR3b is without effect, since the associated circuits are open at other points. The opening of contact CR3a interrupts the only remaining energizing circuits for valves 62 and 64, thereby restoring the combined air and hydraulic electrode control system to its original condition, all as described in detail in the Purat application. The above-described resetting operations, consequently, serve to restore the system to its normal condition, in readiness for the next welding operation.

A welding operation comprising only two heating and two cooling stages may be effected by closing pilot switch P2. The resulting operations are the same with the exception that such closure also energizes relay CR9 (top of Fig. 1). Upon being energized, this relay closes its sole contact CR9a, which serves, as shown in Fig. 2, to connect the coil of relay CR7 to the commutator terminal a5. It will be recalled that the arm 126 moves into engagement with this terminal immediately following the conclusion of the second cooling stage. Since, also, the energization of relay CR7 terminates the welding operation, as described above, it will be appreciated that by energizing this relay, following the second cooling stage, the cycle may be limited, as aforesaid. Also, a single stage operation can be effected by closing pilot switch P3, which action, in addition to the other described operations, energizes relay CR10. If energized, relay CR10 closes its contact CR10a and connects the coil of relay CR7 to the commutator terminal a3. It will be recalled that this terminal is engaged at the conclusion of the first cooling stage.

Considering now the operation of the phase shift compensating elements comprising the resistor $r12$, it will be appreciated that during the gradual discharge of the impulsing condenser C13, which takes place, as aforesaid, throughout at least the initial portions of each heating period of each heating stage, the glow discharge valve 39 remains non-conductive, and consequently the negative grid bias of valves V7 and V8, is determined entirely by the changing charge on condenser C13. This changing charge, in turn, provides a corresponding progressive advance of the heat setting of the system and causes the flow of a value of welding current which is determined by the impedance of the welding circuit. When a critical value of welding current is attained, corresponding, for example, to the adjusted maximum heat setting of valves V5 and V6, under conditions of maximum impedance of the welding circuit, valve 39 breaks down and applies an adjusted proportion of the potential of the pick-up winding 34 across the resistor $r12$. This latter potential, as aforesaid, is additive with respect to the then existing potential of condenser C13 and serves to correspondingly increase the negative grid bias of valves V7 and V8, thereby correspondingly retiring the heat setting of valves V5 and V6. The value of welding current that flows, consequently, is determined by a heat setting which, in turn, is determined by the added potentials of condenser C13 and resistor $r12$.

Assuming by way of a second example, that the welding circuit contains a lower value of impedance, valve 39 may be expected to break down before condenser C13 has discharged to a value corresponding to the maximum heat setting. In such case, condenser C13 continues to discharge after valve 39 has broken down. During this continued discharge, the welding current tends to continue to increase by virtue of the decreasing negative bias effect of condenser C13. Any tendency, however, for the welding current to increase, tends to increase the output of the pick-up winding 34 and to proportionately increase the potential across resistor $r12$. Any such increase in the potential across resistor $r12$ would increase the negative bias of valves V7 and V8, which action, in turn, would retire the heat setting. The component of voltage introduced into the heat controlling circuit from the pick-up winding 34 thus functions to hold the actual welding current to a value corresponding to the maximum heat setting determined by condenser C13. This is for the reason, by way of a summary, that any tendency of the welding current to assume a value above or below the predetermined value, is met by a corresponding decrease or increase in the potential across resistor $r12$, which latter change is in a direction to oppose the change in the welding current. It will be appreciated that since the herein provided control elements may be regarded as inertialess, the corrective effect appears virtually simultaneously with the increase or decrease in welding current which produces it and, consequently, there is only a negligible tendency of the system to hunt between welding current values above or below the desired normal value.

At the conclusion of each heating period, the charging up of condenser C13 increases the negative bias on valves V7 and V8, which increase is opposed by the compensating effect of resistor r12. Within the limits of its effectiveness, resistor r12 opposes the decrease in value of welding current. As aforesaid, however, it is preferred to so adjust the system that under normal conditions the potential across resistor r12 is of the order of 10% of the maximum heat setting, or minimum potential, of condenser C13. The gradual charging up of condenser C13 thus overcomes the compensating effect of resistor r12 and, at some intermediate stage of the cooling period, brings the welding current to a value too low for the output of winding 34 to sustain a discharge through valve 39. At such time, valve 39 again isolates resistor r12 from the pick-up winding and maintains it isolated until the critical point in the next heating stage is attained.

Although only a single embodiment of the invention has been described in detail, it will be appreciated that various changes may be made therein within the spirit and scope of the invention.

What is claimed is:

1. In a control system for controlling the flow of current between a load circuit and a source of alternating current, the current in said load circuit serving to heat work, the combination of means for causing current flow to said load circuit during each of a succession of "on" periods each comprising a controlled plurality of half cycles of said source, means for causing the current during each "on" period to gradually increase from a starting value to a maximum value and to thereafter decrease to a minimum value, means for preventing said current flow during "off" periods intervening between said "on" periods, each "off" period comprising a controlled plurality of half cycles of said source, control means operable to initiate the first said "on" period, and means operably responsive to the heating of the work for controlling at least certain of said second and third-mentioned means.

2. In a control system for causing flow of current to a load circuit from a source of alternating current during successive "on" periods and for preventing such flow during successive "off" periods, said periods each comprising a plurality of cycles of the source and said flow of current serving to heat work, the combination of electric discharge means actuable to pass current during each half cycle of each said "on" period, means for variably controlling the portion of each such half cycle throughout which said discharge means passes current to thereby cause the current so passed to gradually increase from a starting value to a maximum value and to thereafter decrease to a minimum value, means for preventing said current flow during said "off" periods, control means for initiating the first said "on" period, and means operably responsive to the heating of the work for controlling at least certain of said second and third-mentioned means.

3. In a control system for causing flow of current to a load circuit from a source of alternating current during successive "on" periods and for preventing such flow during successive "off" periods, said periods each comprising a plurality of cycles of the source and said flow of current serving to heat work, the combination of electric discharge means actuable to pass current during each half cycle of each said "on" period, means for variably controlling the portion of each such half cycle throughout which said discharge means passes current to thereby cause the current so passed to gradually increase from a starting value to a maximum value and to thereafter decrease to a minimum value, means for preventing said current flow during said "off" periods, control means for initiating the first said "on" period, and means operably responsive to the heating of the work for initiating each "off" period.

4. In a control system for causing flow of current to a load circuit from a source of alternating current during successive "on" periods and for preventing such flow during successive "off" periods, said periods each comprising a plurality of cycles of the source and said flow of current serving to heat work, the combination of electric discharge means actuable to pass current during each half cycle of each said "on" period, means for variably controlling the portion of each such half cycle throughout which said discharge means passes current to thereby cause the current so passed to gradually increase from a starting value to a maximum value and to thereafter decrease to a minimum value, means for preventing said current flow during said "off" periods, control means for initiating the first said "on" period, impulsing means operable periodically during each "on" period for controlling said second-mentioned means, and means operably responsive to the heating of the work for initiating each "off" period.

5. In a control system for causing flow of current to a load circuit from a source of alternating current during successive "on" periods and for preventing such flow during successive "off" periods, said periods each comprising a plurality of cycles of the source and said flow of current serving to heat work, the combination of electric discharge means actuable to pass current during each half cycle of each said "on" period, means for variably controlling the portion of each such half cycle throughout which said discharge means passes current to thereby cause the current so passed to gradually increase from a starting value to a maximum value and to thereafter decrease to a minimum value, means for preventing said current flow during said "off" periods, control means for initiating the first said "on" period, impulsing means operable periodically during each "on" period for controlling said second-mentioned means, and means operably responsive to the heating of the work for initiating each "off" period, said last-mentioned means serving to delay the beginning of each "off" period until the current has fallen to said minimum value.

6. In a control system for controlling flow of current between a work circuit and a source of periodic current, said current serving to heat work, electric valve means for controlling said flow, control means for actuating said valve means to enable said flow during a succession of periods of said source, varying means for causing the portions of the said periods throughout which said flow occurs to vary in accordance with a predetermined pattern, and means operably responsive to the heating of the work for determining the number of periods to be included in said succession.

7. In a control system for controlling flow of current between a work circuit and a source of periodic current, said current serving to heat work, electric valve means for controlling said flow, control means for actuating said valve means to enable said flow during a succession of periods of said source, varying means for causing the portions of the said periods throughout which said flow occurs to vary in accordance with a predetermined pattern, one of said varying and control means being operably responsive to the other, and means operably responsive to the heating of the work for determining the number of periods to be included in said succession.

8. In a control system for controlling flow of current between a work circuit and a source of periodic current, electric valve means for controlling said flow, control means for actuating said valve means to enable said flow during a succession of periods of said source, varying means for causing the portions of the said periods throughout which said flow occurs to vary in accordance with a predetermined pattern, timing means for operating said varying means, and means operated as a consequence of the flow of said current for additionally operating said varying means to alter said pattern.

9. In a control system for controlling flow of current between a work circuit and a source of periodic current, said flow serving to heat work, electric valve means for controlling said flow, control means for actuating said valve means to enable said flow during a succession of periods of said source, varying means for causing the portions of the said periods throughout which said flow occurs to vary in accordance with a predetermined pattern, timing means for controlling said varying means, and means operably responsive to the heating of the work for additionally controlling said varying means to thereby alter said pattern.

10. In a control system for controlling flow of current between a work circuit having an impedance which is subject to variation and a source of periodic current, normally non-conductive electric valve means for controlling said flow, means including a control valve for rendering said valve means conductive at a controlled point in each period of the source during which said current is to flow, the conductivity of said control valve serving to determine said point and said conductivity being determined by the potential impressed between a principal electrode and a control electrode with which said control valve is provided, means for impressing a predetermined potential between said electrodes, and additional means responsive to an electrical characteristic of the work circuit for impressing an additional potential between said electrodes so as to maintain the average current in said work circuit at a value corresponding to the setting of said starting means independently of variations in said impedance.

11. In a control system for controlling the flow of current between a load circuit and a source of alternating current, the combination of control means for causing current flow to said load circuit during each of a succession of "on" periods each comprising a controlled plurality of half cycles of said source and for causing the current during each "on" period to gradually increase from a starting value to a maximum value, and additional control means for causing current to gradually decrease at the conclusion of each "on" period from said maximum value to a minimum value and for preventing said current flow during "off" periods intervening between said "on" periods, each "off" period comprising a controlled plurality of half cycles of said source, certain of said control means being operable as a consequence of manual control and others of said controls being operable as a consequence of the flow of current to said load circuit.

FRED H. JOHNSON.
CHESTER F. LEATHERS.

REFERENCES CITED

The following references are of record in the file of this patent:

UNITED STATES PATENTS

| Number | Name | Date |
| --- | --- | --- |
| 2,314,691 | Dawson et al. | Mar. 23, 1943 |
| 2,303,453 | Gulliksen | Dec. 1, 1942 |
| 2,250,207 | Schneider | July 22, 1941 |
| 2,113,220 | Power | Apr. 5, 1938 |
| 2,175,920 | Schnarz | Oct. 10, 1939 |
| 2,327,268 | Jenks | Aug. 17, 1943 |
| 2,202,205 | Howe | May 28, 1940 |
| 2,166,305 | Levoy, Jr., et al. | July 18, 1939 |
| 2,275,948 | Dawson | Mar. 10, 1942 |
| 2,361,846 | Garman | Oct. 31, 1944 |

FOREIGN PATENTS

| Number | Country | Date |
| --- | --- | --- |
| 117,852 | Australia | Dec. 16, 1943 |